UNITED STATES PATENT OFFICE.

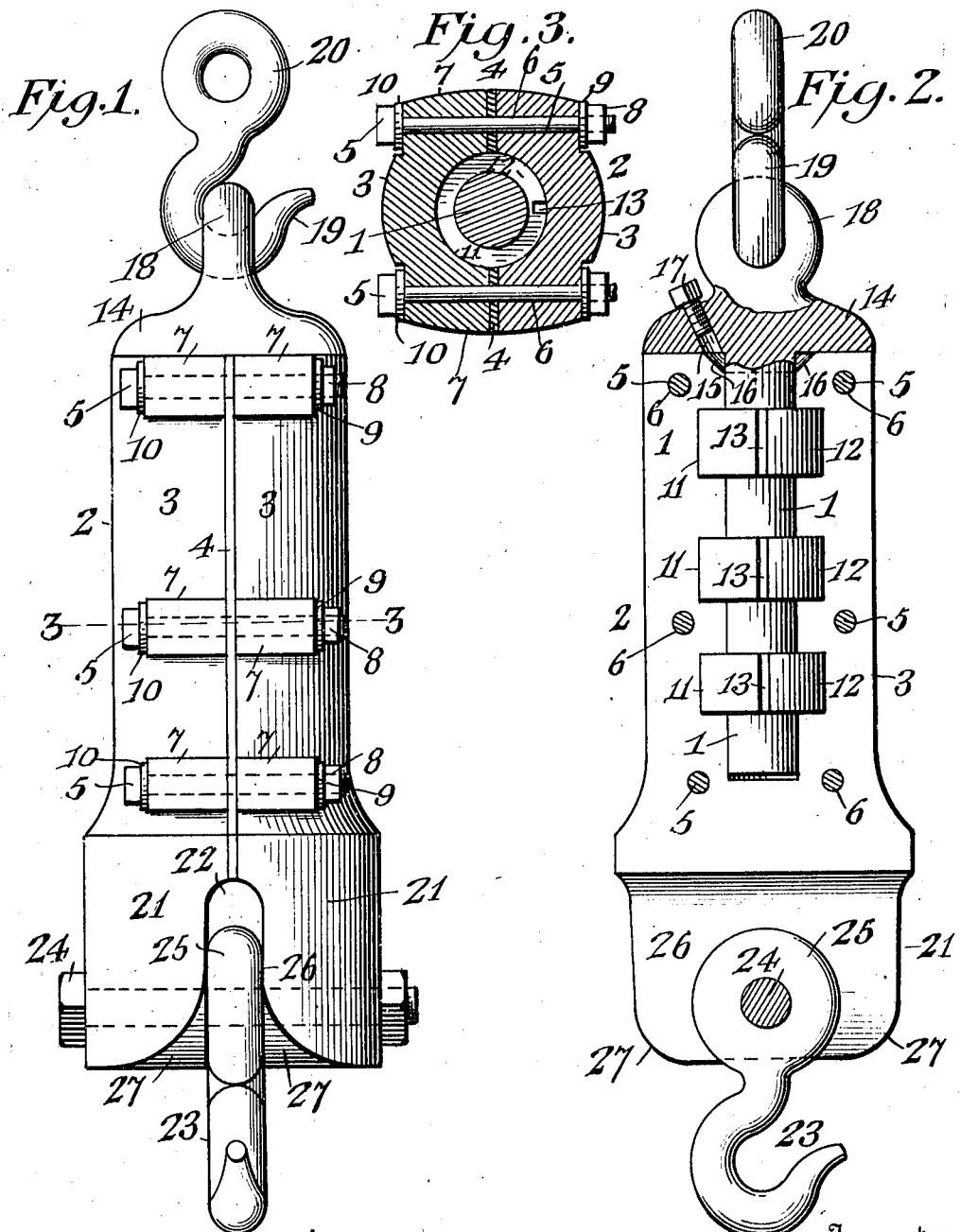
J. SHARP.
SWIVEL.
APPLICATION FILED NOV. 29, 1911.
1,021,271. Patented Mar. 26, 1912.
Witnesses
Jas. F. McCathran
H. F. Riley
Inventor
John Sharp
By E. G. Siggers
Attorney

JOHN SHARP, OF SAN BERNARDINO, CALIFORNIA.

SWIVEL.

1,021,271.

Specification of Letters Patent. Patented Mar. 26, 1912.

Application filed November 29, 1911. Serial No. 663,098.

*To all whom it may concern:*

Be it known that I, JOHN SHARP, a citizen of the United States, residing at San Bernardino, in the county of San Bernardino and State of California, have invented a new and useful Swivel, of which the following is a specification.

The invention relates to improvements in swivels.

The object of the present invention is to improve the construction of swivels, and to provide a simple, strong and efficient one of comparatively inexpensive construction, designed for handling heavy strings of casing in oil and water wells, and adapted to permit the sections of the casing to be readily screwed together and unscrewed without twisting the rope or cable of the hoisting mechanism.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is an elevation of a swivel, constructed in accordance with this invention. Fig. 2 is a longitudinal sectional view of the same. Fig. 3 is a transverse sectional view on the line 3—3 of Fig. 1.

Like numerals of reference designate corresponding parts in all the figures of the drawing.

In the accompanying drawing in which is illustrated the preferred embodiment of the invention, the swivel comprises in its construction a stem 1, and a substantially cylindrical casing 2 closed at its lower end and open at its upper end and composed of two approximately semi-cylindrical sections 3, fitted together at their side and bottom edges, a packing or gasket 4 of suitable material being interposed between the meeting faces or edges for rendering the casing oil tight. The sections of the casing are detachably connected together by horizontal bolts 5, arranged in pairs and located at intervals throughout the length of the casing and passing through alined perforations 6 of the sections, which are preferably provided at the perforations with horizontal bosses or enlargements 7. The bolts are provided with nuts 8, and washers 9 and 10 are preferably interposed between the casing and the heads and nuts of the bolts. The gasket or packing is also pierced by the bolts 5, which retain the said gasket or packing in place between the sections of the casing.

The sectional casing is provided at intervals in the walls of its opening with annular grooves 11 for the reception of annular collars 12 of the stem, whereby the latter and the casing are interlocked with each other and are capable of relative rotary movement. The collars 12 are arranged at intervals and are provided with vertical lubricant channels 13, adapted to permit oil or other lubricant introduced into the casing at the top thereof to flow to the bottom of the casing and thoroughly lubricate the inner bearing faces of the casing and the bearing faces of the stem. This will enable the swivel casing to turn freely on the stem for screwing or unscrewing the pipes or sections of the well casing. The stem is provided at its upper end with a head 14, having a flat lower face to fit the upper edges of the sections of the casing, and provided with an oil passage 15, arranged at an inclination and extending through the head 14 and communicating at its lower end with an annular recess 16 surrounding the upper end of the stem and formed by flaring or enlarging the upper end of the opening of the swivel casing. The lubricant passage 15 is threaded for the reception of a screw plug 17, which forms a closure for the oil passage. The head 14 is also provided with an eye 18, adapted to be engaged by a hook 19 having an eye 20 and designed to be connected with the rope or cable of a derrick.

The sections of the swivel casing are enlarged at the bottom thereof, and are provided at their lower ends with depending integral extensions or projecting portions 21, spaced apart to provide a slot or bifurcation 22 for the reception of a hook 23, which is secured to the sections of the swivel casing by means of a horizontal bolt 24, passing through alined openings in the spaced lower ends or extensions 21 of the sections of the swivel casing, and through an eye 25 of the hook 23. The lower ends or extensions 21 of the sections of the swivel casing are rounded at their outer faces, and they have flat inner side faces 26 forming the side walls of the slot or bifurcation 22 and snugly fitting the eye 25 of the hook 23. The lower ends or extensions 21 of the sections of the swivel casing are also rounded at the lower corners at 27. The hook 23, or other supporting device is designed to be connected with a well casing or other device to be supported, and the pipes or sections of a well casing may be easily handled and screwed together and unscrewed without twisting or kinking the rope or cable, which is connected with the hook 19. The weight to which the swivel is subjected is equally distributed to the sections of the casing and the stem of the swivel.

Having thus fully described my invention, what I claim as new and desire to secure by Letters Patent, is:—

1. A swivel of the class described including a casing open at the top and closed at the bottom and provided at intervals with annular grooves, said casing being adapted to receive and contain a lubricant, and a stem provided at intervals with annular collars fitting in the annular grooves of the casing and provided with lubricant channels extending from the upper to the lower edges of the collars and adapted to permit the lubricant to pass from the top to the bottom of the casing.

2. A swivel of the class described including a casing open at the top and closed at the bottom and provided at intervals with interiorly arranged annular grooves, said casing being composed of longitudinal sections secured together, a gasket or packing interposed between the sections of the casing, and a stem provided at intervals with annular collars fitting in the grooves of the casing and having lubricant passages extending from the upper to the lower edges of the collars to permit the lubricant to pass from the top to the bottom of the casing.

3. A swivel of the class described including a casing closed at the bottom and open at the top and provided at intervals with annular grooves, the opening of the casing being enlarged at the upper end to form a lubricant receiving groove or recess, and a stem fitting in the casing and provided at intervals with annular collars arranged in the grooves and having lubricant passages, said stem being also provided at the top with a head fitted against the upper end of the casing and provided with a lubricant passage extending from the exterior of the head to the said lubricant groove or recess.

4. A swivel of the class described including a sectional casing split longitudinally and open at one end and closed at the other and provided at its closed end with integral projecting portions spaced apart to form a slot or bifurcation, a stem secured in the casing, and a supporting device arranged in the said slot or bifurcation and secured to the projecting portions of the casing.

5. A swivel of the class described including a sectional approximately cylindrical casing open at its upper end and closed at its lower end, the latter being enlarged and provided with depending integral extensions spaced apart to form a slot or bifurcation and having alined openings, a stem secured in the casing, a supporting device having an eye fitted in the slot or bifurcation between the said extensions, and a fastening device passing through the openings of the extensions and through the eye of the supporting device.

In testimony that I claim the foregoing as my own, I have hereto affixed my signature in the presence of two witnesses.

JOHN SHARP.

Witnesses:
 GEORGE HADON,
 E. RUTH SHAW.